July 19, 1966
F. H. MAGNUS
3,261,652
ADJUSTABLE TEMPLE FOR EYEGLASSES WITH RACK AND
PLURAL DETENT BAR
Filed July 18, 1962
3 Sheets-Sheet 1
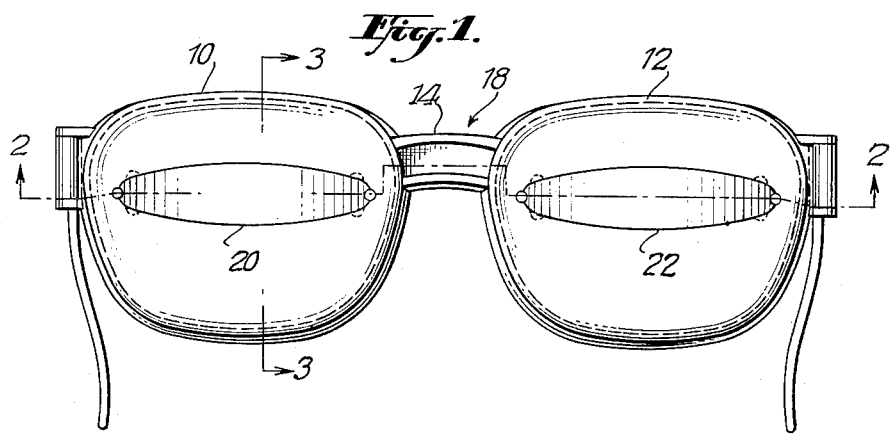
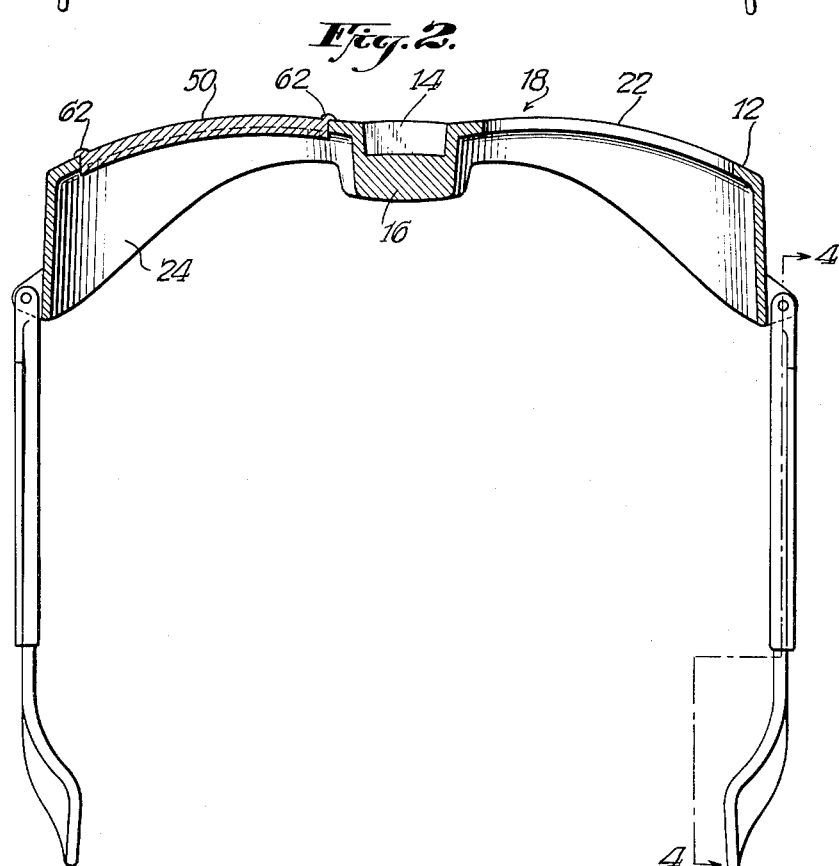
INVENTOR.
FINN MAGNUS.
BY
ATTORNEYS.

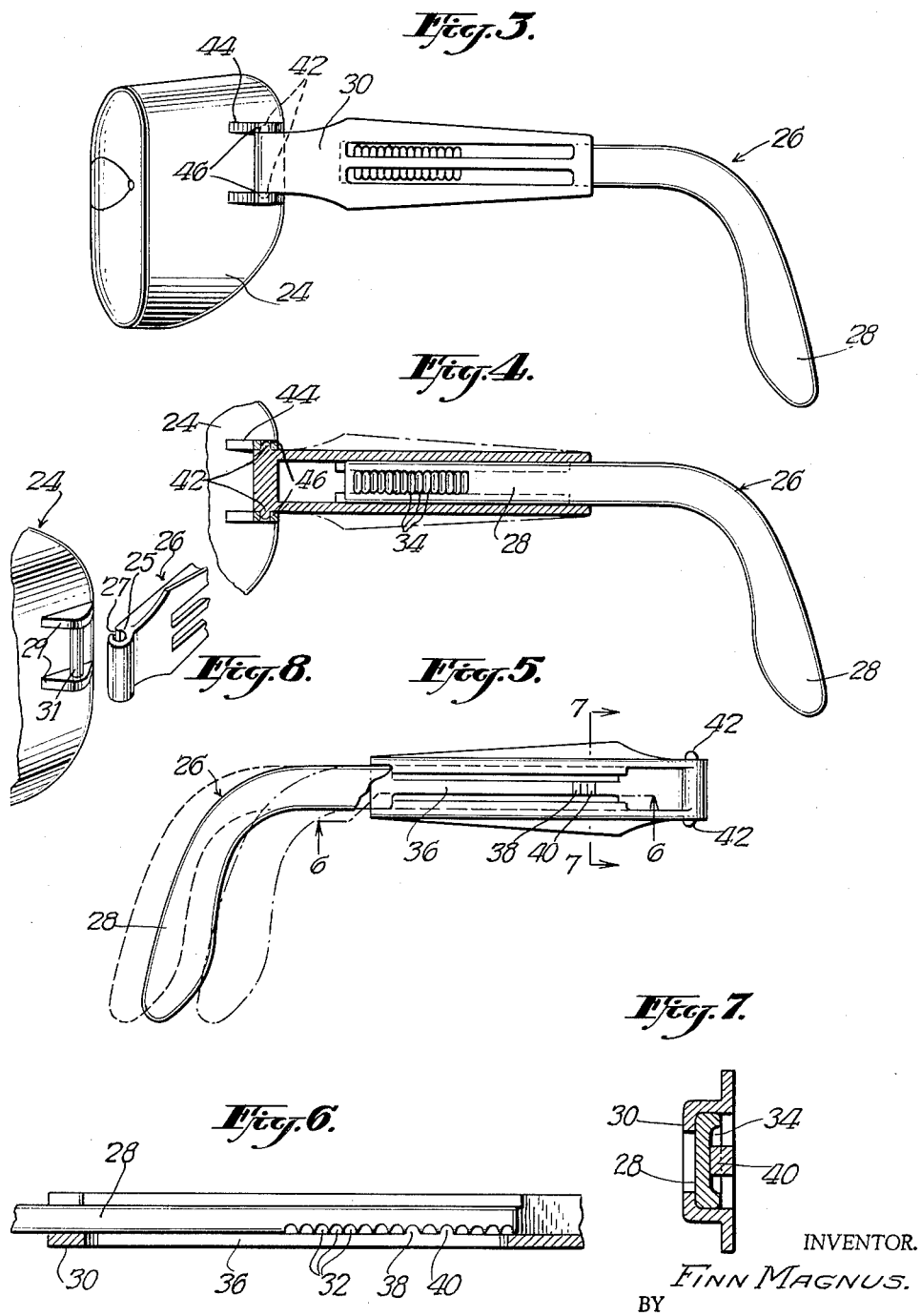

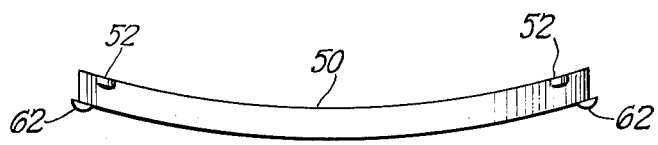
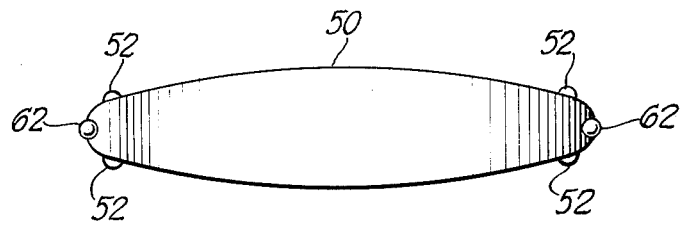
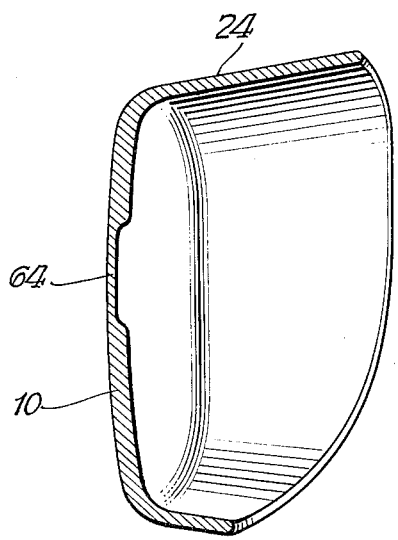
INVENTOR.
FINN MAGNUS.

United States Patent Office 3,261,652
Patented July 19, 1966

3,261,652
ADJUSTABLE TEMPLE FOR EYEGLASSES WITH RACK AND PLURAL DETENT BAR
Finn H. Magnus, Washington Valley Road, Morristown, N.J.
Filed July 18, 1962, Ser. No. 210,901
2 Claims. (Cl. 351—118)

This invention relates to eyeglasses and more particularly to improvements in the construction of sun glasses which may be provided with auxiliary lenses, if desired. While sunglasses have been known and utilized for many years, they have been characterized by certain imperfections, not the least of which is eye strain. Quite surprisingly I have found that eye strain is considerably reduced when the eyes are shaded from the top, bottom and sides. One of the principal features of my invention is to provide sunglasses which maintain clear vision for reading in the direct sun light, viewing television, night driving, outdoor activities in a snow environment and many other conditions without the usual eye strain. Also the glasses will protect the eyes from irritation or damage due to wind or particles of foreign matter.

Another aspect of my invention resides in the provision of temples that are readily removable and adjustable to fit the size and contour of the wearer's head. A further aspect of this invention is the provision of a unique bridge structure which eliminates interference with the wearer's nasal passages and the discomfort resulting therefrom.

As an important aspect of my contribution, I provide sunglasses which are readily moldable in an integral, one piece construction, whereby the frame, lenses and bridge are all one piece, thereby eliminating the usual frame structure which causes vision obstruction. My concept further includes means for providing lenses which may be tinted, if desired.

Another object of this invention consists in providing an economical, rigid, durable construction while concurrently maintaining a pleasing appearance. Those skilled in the art of manufacturing glasses will readily realize that the normal structure requires five-point adjustment when fitting the eyeglasses to the individual wearer. The cross bridge which rests upon the top of the wearer's nose requires adjustment. The two side pieces which are positioned below the bridge but against the sides of the wearer's nose also require attention when fitting a pair of glasses. Glasses constructed according to the prior art were furnished with a pair of stationary temples which required considerable hand fiting by the opticians. It is noted that to make the aforementioned five-point adjustment to a pair of glasses the optician was required to grind, heat and bend the various components of the glasses. As an important feature of my inventive concept, I have reduced the points of adjustment to three. They include one guiding point on the bridge of the glasses and the two temples. This, of course, simplifies the fitting of the eyeglasses to the individual wearer's requirements.

In order to achieve the aforementioned features and objectives this invention contemplates the provision of a novel construction of sunglasses comprising but not limited to a pair of lenses, a bridge and a shield, all of which are molded as a single integral piece from tinted semiopaque resilient plastic material. Each of the lenses is provided with a horizontally extending slit. The slit may be left open, covered with an auxiliary lens, or the area outlined by the slits may consist of the same material as the lens, but of a reduced thickness, as desired. The aforementioned bridge is built up inwardly and is snugly fitted across the upper bridge portion of the wearer's nose. The shield merges with the outer edges of the lenses and projects inwardly therefrom. The inner edge of the shield has a shape which substantially corresponds to the contour of the wearer's head.

The temples each comprise an earpiece and a coupling member with a longitudinally adjustable detent-rack means disposed therebetween. One end of the coupling member is removably, pivotally and frictionally connected to lugs formed integrally with the lenses for that purpose. The other end of the earpieces is positioned behind the wearer's ear when the sunglasses are in a position of use.

There has thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent constructions as do not depart from the spirit and scope of the invention.

Specific embodiments of the invention have been chosen for purposes of illustration and description, and are shown in the accompanying drawings, forming a part of the specification, wherein:

FIG. 1 is a front elevation showing a pair of sun glasses in accordance with the concept of my invention;

FIG. 2 is a horizontal section taken along line 2—2 of FIG. 1;

FIG. 3 is a side elevation showing a temple and connecting means at the end thereof;

FIG. 4 is a vertical section taken along line 4—4 in FIG. 2;

FIG. 5 is a side elevation partially broken away showing the longitudinal adjustment aspect of the temple;

FIG. 6 is a section taken along line 6—6 of FIG. 5;

FIG. 7 is a sectional view taken along line 7—7 of FIG. 5;

FIG. 8 is a perspective view showing another embodiment of the temple construction;

FIG. 9 is a top plan view showing an auxiliary lens;

FIG. 10 is a plan view of the auxiliary lens shown in FIG. 9; and

FIG. 11 is a sectional view taken along line 3—3 of FIG. 1.

Referring now to the drawings in greater detail, FIGS. 1 and 2 illustrate a frame portion 18 comprising a bridge structure 14 disposed between two lens portions 10 and 12. A shield portion 24 is formed adjacent to the lens portions 10 and 12. The above mentioned bridge, lenses and shield portion are adapted to be molded in one integral piece from tinted semiopaque resilient plastic material or the like. This material will allow vision therethrough, but will restrain glare. Further, it is sufficiently rigid so that it provides adequate structural strength. Also, this material is adaptable for tinting by various ornamental and pleasing coloring media. The bridge structure 14 comprises an inwardly projecting built up portion 16 which is contoured snugly to fit across the upper bridge portion of the wearer's nose. The bridge 14 mergers with the two lens portions and acts as a connecting link therebetween.

Referring to the lens portions 10 and 12, each one is illustrated in FIG. 1 as having a generally oval or elliptical shaped peripheral contour. However, any other suitable geometrical contour would be included within the scope of my invention. In FIG. 2 the lenses are shown as having a slight concave curvature as seen in a horizontal section. This curvature illustrates my preferred embodiment, but either a plane or a different curvature may be employed, if desired. The thickness of the lens is not critical and any suitable thickness may be adopted, but I prefer a thickness of the order of .060 inch.

Referring again to FIG. 1, elongated horizontally disposed elliptical slots or slits in the lenses 10 and 12 are designated by the numerals 20 and 22, respectively. These slits are each substantially centrally located as shown. They extend horizontally across the greater portion of the lens and have a width which is relatively small as compared to the length. I prefer an elliptical shaped slot having a major axis of the order of 2 inches and a minor axis of the order of ½ inch. The slits 20 and 22 are positioned so that the direct, forward, horizontal line of vision of the wearer is directed therethrough. Since the lens itself is manufactured from a tinted semiopaque resilient plastic and the slit is open to pass light therethrough, I have found that the general contour of the slit as illustrated in FIG. 1 provides suitable direct vision while still eliminating glare.

FIGS. 2 and 3 illustrate the shield portion 24 of the sunglasses. This portion merges with the frame portion 18 at the outer edge thereof and projects at an angle of approximately 90 degrees therefrom in a direction generally towards the wearer. The inside edge of the shield is shaped so that it follows the natural human contour of the wearer's head portion adjacent thereto. Thus, the shield portion 24 has a longer apron-like projection across the top of the lenses at the outer edges thereof and gradually shortens as it approaches the central bridge structure 14. Likewise, the bottom of the shield has a longer apron-like projection towards the outer portion of the lenses 10 and 12 and gradually shortens as it approaches the central bridge structure 14. The bottom and top portions of the apron-like shield merge together at the outer edges of the lenses. Since the entire shield portion 24 is also manufactured from tinted semiopaque resilient plastic, light passing therethrough is limited, and unimpeded light rays reach the eyes only through the aforementioned slits 20 and 22.

Referring now to FIGS. 3 through 7 the temple designated generally as numeral 26 is shown in greater detail. It comprises an earpiece 28 and a coupling member 30. One end of the ear piece 28 is contoured to comfortably fit the wearer's ear. The other end of the earpiece 28 is provided with a U-shaped cross section as illustrated in FIG. 7. An elongated rack 32 is located upon the concave side thereof. A mating portion of the coupling member 30 is formed with a longitudinal channel shaped slideway 34 therein. A longitudinally extended detent bar 36 extends lengthwise along one side of said slideway. The detent bar is provided with a plurality of detents 38 and 40 which project inwardly into said slideway.

The earpiece 28 is inserted into the slideway 34 and pushed longitudinally inwardly or outwardly as required. The detents 38 and 40 engage in the rack 32 thereby holding the temple in a rigid preselected position for normal use. It is to be pointed out that the temple is manufactured from a resilient plastic material so that the detent 38 will frictionally engage rack 32. Further, from an aesthetic point of view, the temple may have varying colors added to the material which will produce a pleasing effect. The forward portion of the coupling is provided with pin-like projections 42 as shown in FIGS. 3, 4 and 5. The shield 24 is provided with a mating bracket 44 which includes vertical borings 46. The temple is pivotally engageable with the shield by snapping the pin-like projections 42 into position in the borings 46.

Another embodiment of the temple construction is shown in FIG. 8. The temple 26 is provided with a vertical bore 25 which is opened by a key or slot 27 extending the entire length thereof. The shield 24 is provided with lugs 29 with a pin 31 molded therebetween. It is readily seen that the temple is pivotally engageable with the shield by merely snapping the pin 31 into the bore 25 via the slot 27. It is noted that when the temple is in engagement with the shield, it may be pivoted through an arc of the order of 180 degrees. This factor tends to simplify the fitting of the eyeglasses to the individual wearer.

Referring now to FIGS. 9 and 10, auxiliary lens 50 is illustrated. This lens is likewise manufactured from a semiopaque resilient plastic material. It may be tinted in the same manner as the lenses 10 and 12, or aesthetically pleasing contrasting colors may be employed. Further, this lens may be magnifying or formed in accordance with a particular prescription, if desired. The contour of the auxiliary lens 50 is adapted to correspond to its respective slits 20 and 22 in the lenses 10 and 12 so that the auxiliary lens 50 will snugly engage therein. A plurality of ear-like projections, four being shown in FIG. 9, are designated by the numeral 52. Also tabs 62 are provided at convenient locations upon the periphery of the lens 50. At the option of the wearer, the auxiliary lenses may be inserted into position. The ears 52 rest against the adjacent portion of the lens 10 or 12 upon the inside surface. The tabs 62 rest against their adjacent outside portion of lens 10 or 12. A slight flexing of the resilient auxiliary lens is required in order to position it within or to remove it from the slots 20 and 22.

The right hand side of FIG. 2 illustrates lens 12 with slit 22 in its open condition. The left hand side of FIG. 2 shows a section of the eyeglasses with the auxiliary lens 50 in wearing position. The use of the auxiliary lens is optional with the individual wearer; however, it provides a convenient wind shield or the like when desired.

In lieu of the removable lens 50, the area 64 outlined by the slits 20 and 22 may consist of the same tinted plastic as the lenses 10 and 12, but of a reduced thickness of the order of .005 inch, thus to provide an area similar in size and contour to that of the slits and only slightly obstructive of the passage of light therethrough.

From the foregoing description it will be seen that I contribute a novel pair of glasses wherein the lenses, bridge and shield constitute an integral, tinted, semiopaque, resilient plastic member. Each of the lenses is provided with a horizontally extending elliptical slit. The bridge portion is built up inwardly and is snugly fitted across the upper bridge portion of the wearer's nose. The temples each comprise an earpiece and a coupling member. One end of the coupling member is pivotally and frictionally connected to the integral member, and the other end of the coupling member is adjustably connected to the ear piece by means of a detent-rack. The earpiece is positioned behind the wearer's ear when the sun glasses are in use.

Although particular embodiments of the invention are herein disclosed for purposes of explanation, further modifications thereof, after study of this specification, will be apparent to those skilled in the art to which the invention pertains. Reference should accordingly be had to the appended claims in determining the scope of the invention.

What is claimed and desired to be secured by Letters Patent is:

1. An adjustable temple comprising an earpiece having an ear contoured portion and an elongated forward portion, said forward portion being substantially rectangular shaped and having a recessed rack extending along one side face, said rack having rack teeth which are flush with said side face, a coupling member having a mating rectangularly shaped channel providing a sliding fit for the forward portion of said earpiece, a plural detent bar having its ends integrally attached to the front and rear end portions of said coupling member, said detent bar being disposed in spaced relation with respect to the upper and lower side walls of the channel, and said detent bar having inwardly extending detents for engaging said rack.

2. An adjustable temple comprising an earpiece having an ear contoured end portion and an elongated forward portion of resilient plastic material, said forward portion being substantially rectangular shaped and having a recessed rack extending along the outside face thereof, said rack having a plurality of closely spaced teeth which are flush with respect to said outside face, a coupling member having a mating rectangularly shaped channel providing a sliding fit for the forward portion of said earpiece, a plural detent bar positioned adjacent said rack and having its ends integraly attached to the front and rear end portions of said coupling member, said detent bar being disposed in spaced relation with respect to the upper and lower side walls of the channel, and said detent bar having inwardly extending detents for engaging said rack, and the sidewall of the coupling opposite said detent bar having an elongated central opening portion.

References Cited by the Examiner
UNITED STATES PATENTS

| | | | |
|---|---|---|---|
| 1,067,793 | 7/1913 | Barr | 88—54 |
| 1,568,900 | 1/1926 | Metcalf | 88—41 |
| 1,838,352 | 12/1931 | Anderson. | |
| 1,851,443 | 3/1932 | Nutt | 88—41 |
| 2,012,620 | 8/1935 | Bean et al. | 88—41 |
| 2,210,507 | 8/1940 | Spill | 88—53 |
| 2,305,562 | 12/1942 | Thompson et al. | 88—53 |
| 2,312,278 | 2/1943 | Zaiger | 287—58 |
| 2,341,233 | 2/1944 | Norton. | |
| 2,406,190 | 8/1946 | Burdick | 88—41 |
| 2,443,249 | 6/1948 | Jackson | 351—118 X |
| 2,617,100 | 11/1952 | Moeller | 2—14 |
| 2,671,379 | 3/1954 | Eloranta | 88—53 |
| 2,825,266 | 3/1958 | Kleinman | 351—88 |
| 2,887,929 | 5/1959 | Farmer | 88—52 |
| 2,893,351 | 7/1959 | Wager | 287—58 X |
| 3,052,161 | 9/1962 | Berend | 88—52 |

FOREIGN PATENTS

| | | |
|---|---|---|
| 684,924 | 3/1930 | France. |
| 303,716 | 1/1929 | Great Britain. |
| 303,730 | 1/1929 | Grent Britain. |

DAVID H. RUBIN, *Primary Examiner.*

JEWELL H. PEDERSEN, *Examiner.*

D. J. HOFFMAN, *Assistant Examiner.*